(12) United States Patent
Silvestro

(10) Patent No.: US 7,200,897 B2
(45) Date of Patent: Apr. 10, 2007

(54) HOLDER FOR EYEGLASSES

(76) Inventor: Steven M. Silvestro, P.O. Box 6371, Chandler, AZ (US) 85246

(*) Notice: Subject to any disclaimer, the term of this patent is extended or adjusted under 35 U.S.C. 154(b) by 191 days.

(21) Appl. No.: 11/003,489

(22) Filed: Dec. 6, 2004

(65) Prior Publication Data
US 2005/0146676 A1 Jul. 7, 2005

Related U.S. Application Data

(60) Provisional application No. 60/534,396, filed on Jan. 7, 2004.

(51) Int. Cl.
*A44B 21/00* (2006.01)
(52) U.S. Cl. .................. 24/3.3; 24/3.7; 24/3.8
(58) Field of Classification Search ................ 351/123, 351/111, 41; 24/3.3, 3.7, 3.8, 3.11, 3.12, 24/3.13
See application file for complete search history.

(56) References Cited

U.S. PATENT DOCUMENTS

| D163,078 S | 4/1951 | White |
| 2,809,766 A | 10/1957 | Anderson |
| 3,749,231 A | 7/1973 | Nathan |
| D239,986 S | 5/1976 | Artz |
| 3,994,391 A | 11/1976 | Holland |
| D293,622 S | 1/1988 | Suyama |
| D293,977 S | 2/1988 | Ito et al. |
| D307,673 S | 5/1990 | Brown |
| 5,123,525 A | 6/1992 | Orlowski |
| 5,408,728 A * | 4/1995 | Wisniewski .................. 24/3.3 |
| 5,676,242 A | 10/1997 | Scott |
| 5,794,312 A * | 8/1998 | O'Mahony .................. 24/3.3 |
| 5,899,371 A | 5/1999 | Weliver |
| 5,924,558 A | 7/1999 | De Mayo |
| 6,206,258 B1 | 3/2001 | Calder |

FOREIGN PATENT DOCUMENTS

| GB | 823409 | 11/1959 |
| GB | 2 341 941 A | 3/2000 |
| SE | 113836 | 3/1944 |

* cited by examiner

*Primary Examiner*—Hung Xuan Dang
(74) *Attorney, Agent, or Firm*—Richard C. Litman

(57) ABSTRACT

The holder for eyeglasses is a sleeve attached to a clip that holds one temple piece of a folded pair of eyeglasses. The sleeve is tubular, defining a cavity, an open top end and an open bottom end. The sleeve is made of elastic material to grip the temple piece. Optionally, a ring of elastic material is sewn to the top end of the sleeve to further retain the sleeve's grip on the temple piece. The clip is attached to the sleeve parallel to the cavity of the tubular sleeve. The clip permits the sleeve, which holds the eyeglasses, to hang from clothing or an article normally carried on the user's person, such as a purse.

18 Claims, 5 Drawing Sheets

HOLDER FOR EYEGLASSES

CROSS-REFERENCE TO RELATED APPLICATION

This application claims the benefit of U.S. Provisional Patent Application Ser. No. 60/534,396, filed Jan. 7, 2004.

BACKGROUND OF THE INVENTION

1. Field of the Invention

The present invention relates to a holder for eyeglasses. More particularly, the present invention relates to an eyeglass holder that is used to clip a pair of eyeglasses to clothing or to an object usually carried about the person, such as a purse.

2. Description of the Related Art

People who wear eyeglasses often have difficulty keeping track of their eyeglasses when the eyeglasses are not worn. Carrying cases are bulky and inconvenient to carry in one's pocket. In lieu of a carrying case, some methods of retaining unworn eyeglasses have been to stick the temple piece of the glasses in a waistband, on a belt, or in one's pocket, or to move glasses back on top of one's head. The problem with the above mentioned methods are that eyeglasses can easily slip and fall to the ground, becoming broken or scratched. Alternatively, when eyeglasses are placed in one's waistband the glasses can break, because eyeglass frames are not flexible and do not adjust to the movement or bending of one's body.

Sometimes eyeglasses are retained by a tethering device, such as a chain or necklace that is worn around the neck and grips the opposing temple pieces. While such devices have been used effectively, it is often inconvenient and cumbersome to leave the eyeglasses dangling on one's chest when not in use. A holder for eyeglasses that is not bulky, that can be placed in an easily accessible area on one's person or attached to an article normally carried about the person, that can securely hold eyeglasses, and that does not take up too much space is therefore desirable.

U.S. Pat. No. 6,206,258, issued to Calder on Mar. 27, 2001, describes a sunglass carrier for use on a bicycle. The carrier has two parts, a tubular portion and a basket portion. The tubular portion has a generally U-shaped segment with a ridged band secured to one side of the "U". The tubular portion is hooked over a handle bar of a bike and the ridged band is drawn from the attached side across the open side of the "U" to the unattached side to seal off the tube and secure the carrier to the bike. The basket is open at the top and bottom and is attached to one side of the "U" shaped segment. A tongue having a rubber shim on its surface is pivotally connected to the center of the basket. In use, one arm of the eyeglasses or sunglasses goes into the basket from the top and exits out the bottom of the basket. The rubber-shimmed tongue applies some pressure and provides some resistance to keep the arm in the basket.

Pouch-like holders have been developed that receive eyeglasses or other articles through an open top and envelop the entire eyeglass or article. U.S. Pat. No. 3,749,231, issued to Nathan on Jul. 31, 1973, describes a pouch having a clip attached to the back of the pouch. The pouch is situated vertically having an open top. The clip is also positioned vertically to allow the pouch to be hung from a pocket.

U.S. Pat. No. 3,994,391, issued to Holland on Nov. 30, 1976, describes a spectacle clip case for use on a waistband or a belt. The case is an open top pouch with the clip being pivotally attached to an extended lip portion of the case. A preformed fold line located near the lip and below the clip allows the case to adjust to the movement of the user. The clip is a "U" shaped piece of metal.

U.S. Pat. No. 5,123,525, issued to Orlowski on Jun. 23, 1992, describes an open top pouch eyeglass case having a "U" shaped clip to secure the case to a pocket or another object. The clip is not disposed on the exterior of the case. U.S. Pat. No. 5,924,558, issued to De Mayo on Jul. 20, 1999, describes a folding eyeglass case. The case is an open top pouch that can be folded in half when not holding a pair of glasses. The case also has an attachment means to hold small electronic devices such as a pager. The clip is a lever that pivots on a hinge.

U.S. Design Pat. No. 163,078, issued to White on Apr. 24, 1951, shows a combination eyeglass and coin case having an open top and a hook extending from the opening. Swedish Patent 113,836, published Apr. 17, 1945, shows a pocket/pouch having a clip hinged on the back of the pocket/pouch. British Patent Number 823,409, published on Nov. 11, 1959, describes an open-topped flexible pouch having two spring clips attached to the top end of the pouch to receive pencils, pens, rulers, etc.

Numerous hard or semi-hard cover carrying cases have been developed that entirely enclose the object being held. U.S. Pat. No. 5,676,242, issued to Scott on Oct. 14, 1997, describes a rectangular shaped case made of rigid plastic having a clip on one wall of the case. The clip is rectangular and is secured to the case by rivets. British Patent Number 2,341,941, published Mar. 29, 2000, describes a semi-rigid plastic case for holding eyeglasses. The semi-rigid plastic is covered with nylon fabric. The case has a basket-like cavity and a lid for receiving and enclosing glasses. An optional clip may be attached to the case to hold it to a belt.

U.S. Pat. No. 2,809,766, issued to Anderson on Oct. 15, 1937, describes a spectacle case having an elongated shallow body. The case receives eyeglasses through a hinged cover located at the top of the case. The case is made from durable materials, such as metal, molded plastic, etc.

Other cases having a lid or a cover that fully encase an object and have a clip are shown or disclosed in: U.S. Design Pat. No. 239,986, issued to Artz on May 25, 1976 (rectangular carrying case being attachable to a belt); U.S. Design Pat. No. 293,622, issued to Suyama on Jan. 12, 1988 (camera case); U.S. Design Pat. No. 293,977, issued to Ito et al. on Feb. 2, 1988, (camera case); U.S. Pat. No. 5,899,371, issued to Weliver on May 4, 1999 (a zippered golf pack-pouch made of rigid material that is covered with a soft canvas having a clip to attach it to a wearer's belt or golf bag); and U.S. Design Pat. No. 307,673, issued to Brown on May 8, 1990 (pager carrying case).

None of the above inventions and patents, taken either singly or in combination, is seen to describe the instant invention as claimed. Thus a holder for eyeglasses solving the aforementioned problems is desired.

SUMMARY OF THE INVENTION

The holder for eyeglasses of the present invention is a tubular sleeve attached to a clip that holds one temple piece of a pair of eyeglasses. The tubular sleeve defines a cavity with both an open top end and an open bottom end. The temple piece is inserted in the top end of the sleeve and exits out the bottom end. The sleeve is made of neoprene or leather to grip the temple piece when it is in the cavity. As an added feature, a band, preferably made of elastic material, is sewn to the top end of the sleeve to tighten the sleeve's grip on the temple arm. The clip is attached to the sleeve, parallel to the cavity of the tubular sleeve. The clip permits the sleeve, which holds the eyeglasses, to hang from clothing or an article usually carried about the person, such as a purse.

The clip is generally U-shaped, and includes a resilient arm that secures the holder to the user's person. The clip may be made from metal or plastic. The eyeglass holder of the present invention offers a convenient and compact device for keeping eyeglasses handy that is also quick and easy to use.

These and other features of the present invention will become readily apparent upon consideration of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
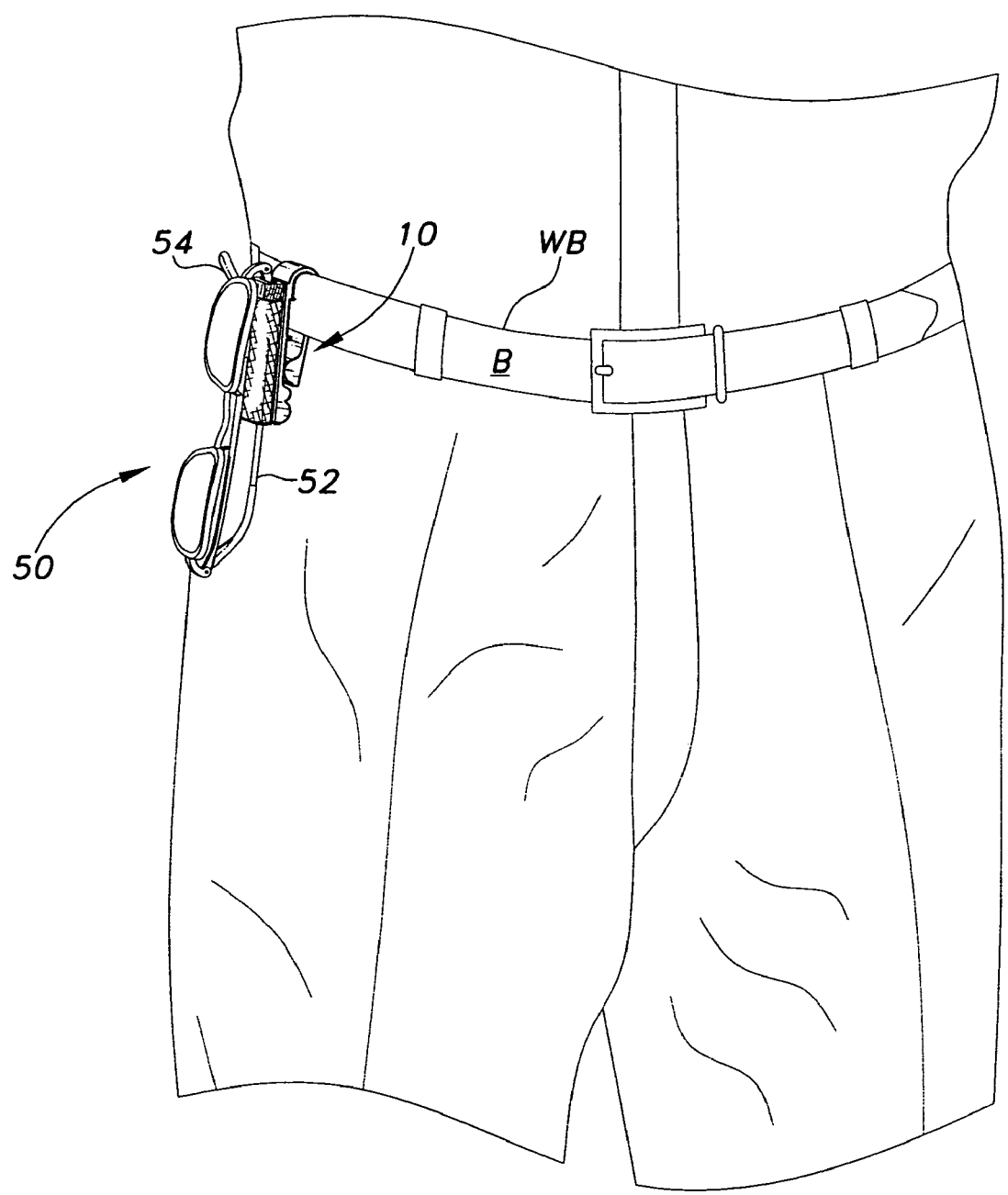
FIG. 1 is an environmental, perspective view of a holder for eyeglasses according to the present invention.

The present invention is a holder for eyeglasses, designated generally as 10 in the drawings. As shown in FIG. 1, the holder 10 permits a user to hang a pair of eyeglasses 50 from the user's belt B or waistband WB. The holder 10 can, however, easily be used on other articles besides a belt B or waistband WB, such as a purse strap, a bill of a cap, a sun visor in a car, etc.

The holder 10 works by holding a temple piece 52 or 54 of the eyeglasses 50. In FIG. 1, temple piece 52 is inserted through the holder 10 with temple piece 54 resting outside the holder 10 on the glasses 50. The holder 10 therefore not only allows a user to wear the holder 10 in an easily accessible location, it also allows the user to insert and remove the eyeglasses 50 with ease.

Figure 2:
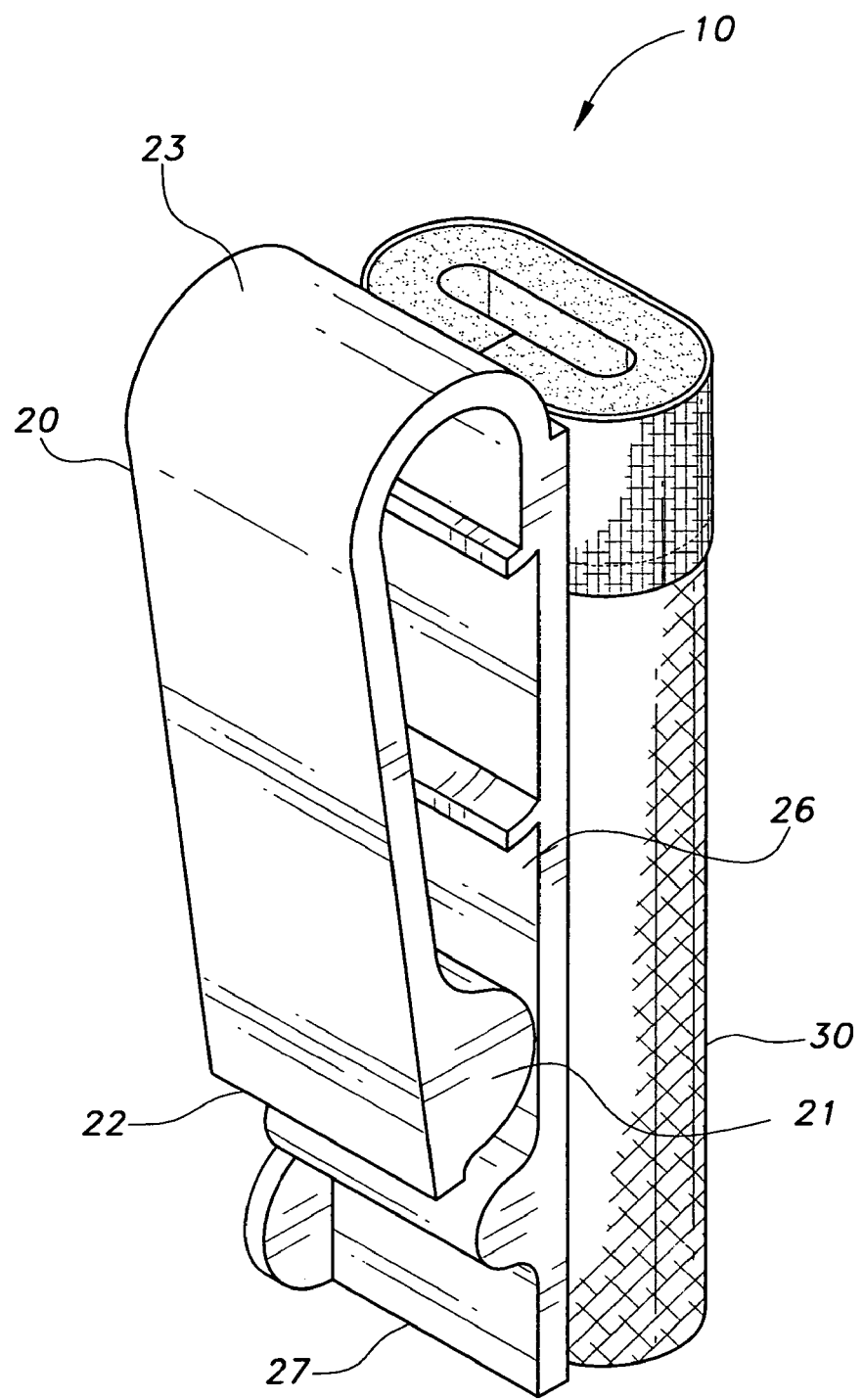
FIG. 2 is a perspective view of a holder for eyeglasses according to the present invention.
Figure 3:
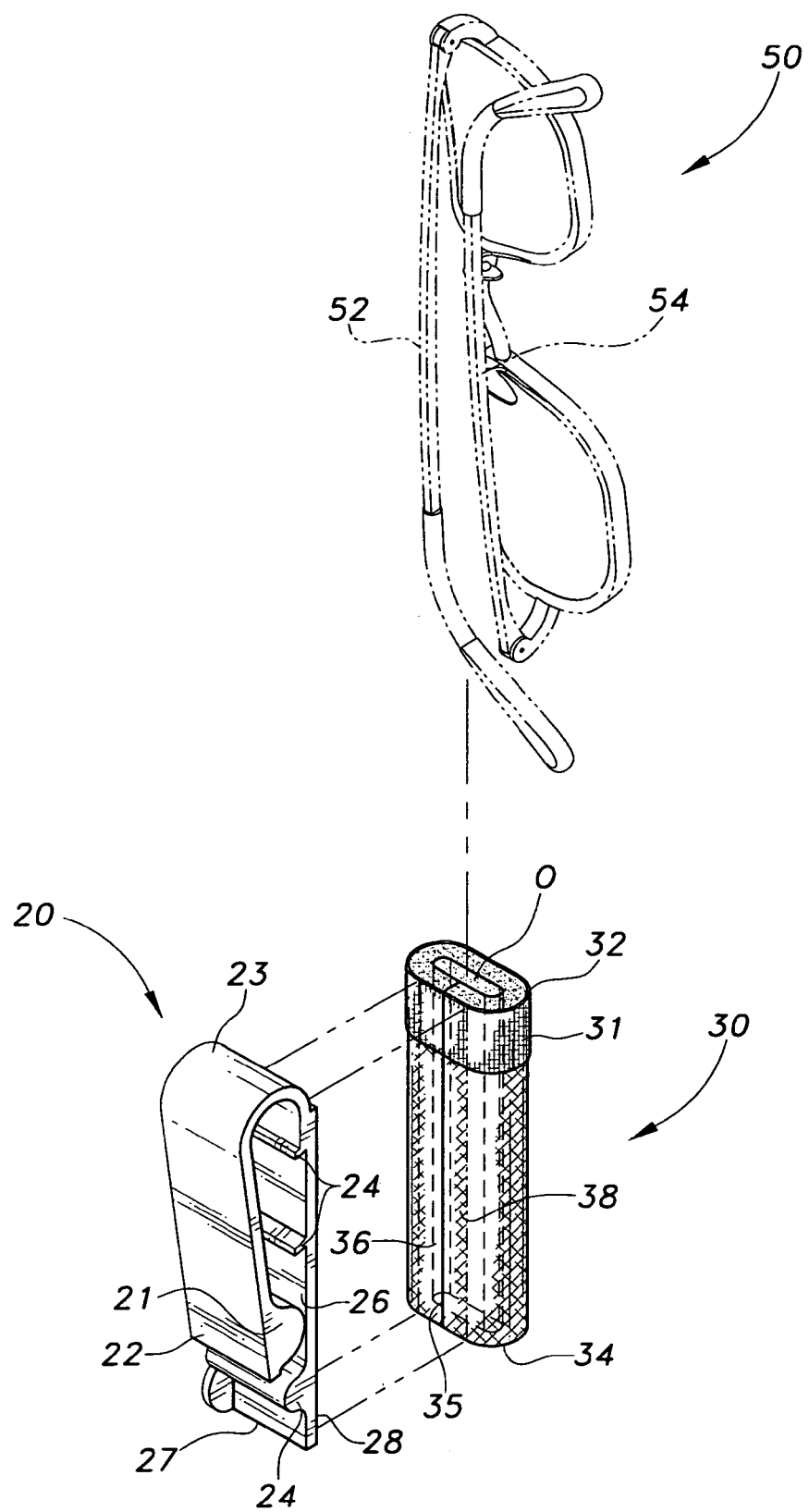
FIG. 3 is an exploded, perspective view of a holder for eyeglasses according to the present invention as seen from the rear.

As shown in FIGS. 2–3, the holder 10 comprises a fastener, such as a clip 20, and a sleeve 30. The clip 20 is shaped as an inverted "U". The clip 20 has three regions: a first arm 22, a U-shaped region 23, and a second arm 27. Second arm 27 has a rear surface 26 and a front surface 28. First arm 22 has a bead or lip 21 extending across its lower end facing rear surface 26.

First arm 22 is resiliently biased so that lip 21 abuts or closely approximates rear surface 26. U-shaped region 23 flexes sufficiently to allow first arm 21 to slip over a belt, waistband, pocket, or other support, while lip 21 helps to prevent the lower end of first arm from inadvertently sliding back up over the belt, waistband, etc., thereby retaining the clip on its support.

Referring now to FIG. 3, a number of ribs 24 may extend transversely across rear surface 26, thereby strengthening second arm 27. Second arm 27 may also have a bead or lip extending across rear surface 26 that cooperates with lip 21 to clench a belt, waistband, pocket, or other support therebetween. Alternatively, a spring-loaded clip or other type of fastener may be used with the holder 10, as long as the fastener firmly secures the holder 10 to the article it is being secured to.

The sleeve 30 is tubular, having an open top end 32, an open bottom end 34 and defining a cavity O disposed between the top end 32 and the bottom end 34. The open top end 32 of the sleeve 30 may include a ring of elastic material 31 to tighten the grip the sleeve 30 has on the temple piece 52 or 54 when the temple piece 52, 54 is inserted in the open cavity O. The elastic ring 31 is preferably sewn or otherwise attached to the top end 32 of the sleeve 30.

Figure 4:
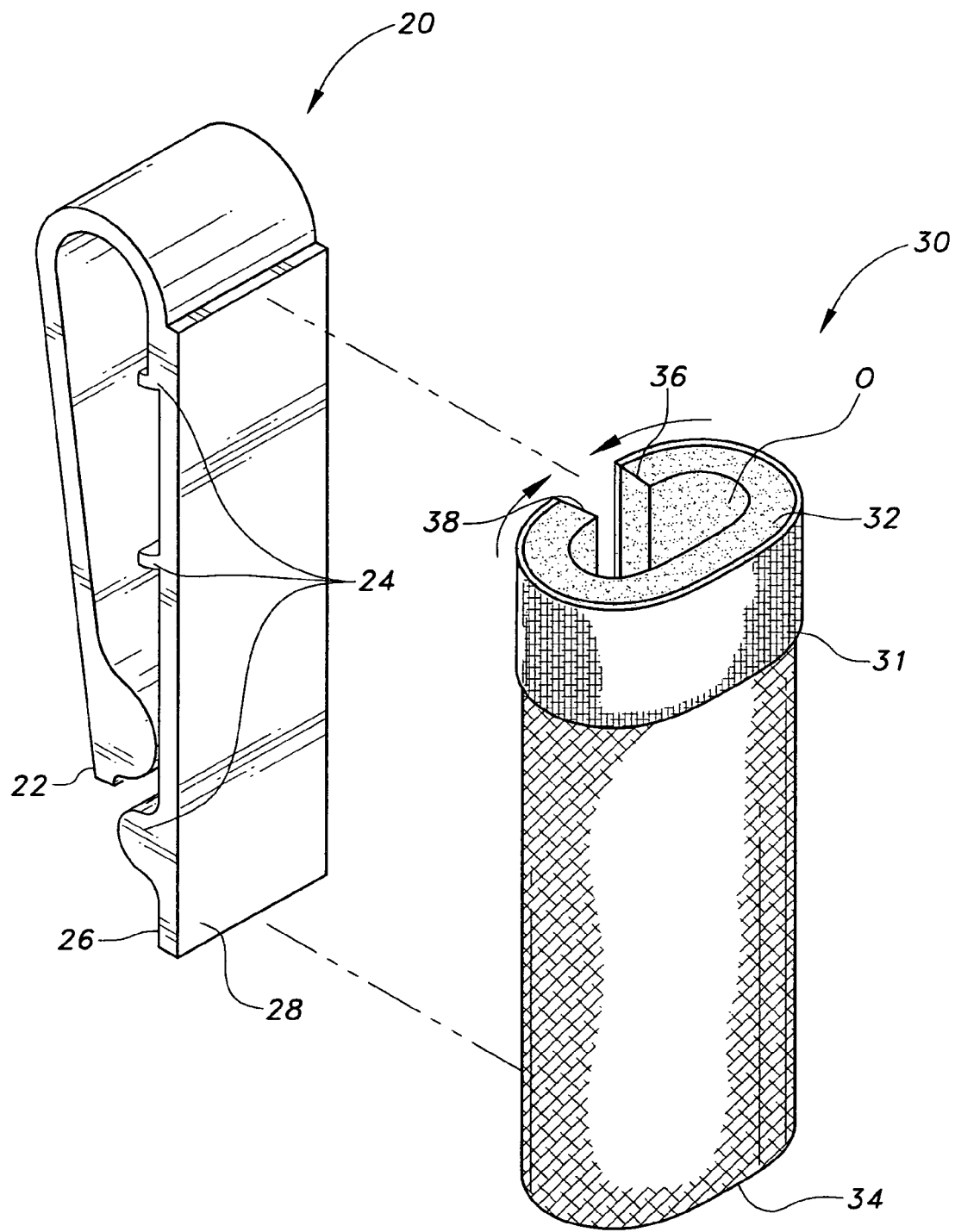
FIG. 4 is an exploded, perspective view of a holder for eyeglasses according to the present invention as seen from the front.

Referring now to FIG. 4, the tubular sleeve 30 is about as long as the length of the clip 20. In a pre-constructed stage, the sleeve 30 is generally a rectangular shaped piece of material that is transformed into the tubular shape by joining one side 38 to a second side 36, creating a lengthwise seam 35. The sleeve 30 is preferably made from-neoprene material for its resilience and elasticity. However, the sleeve 30 may be made from other supple material that is able to stretch, for example, spandex. Alternatively, the sleeve 30 may be made with a neoprene liner providing a surface having a high coefficient of friction for gripping the temple piece and preventing sliding of the temple piece, and an outer coating of leather, felt, or other material providing a soft, finished exterior look. The sleeve 30, made of stretchable material, is designed to retain the temple piece 52, 54 of a pair of eyeglasses 50 when received in the cavity O. The stretchable material of sleeve 30 allows the temple piece 52 or 54 to be retained without applying too much pressure.

The sides 38, 36 may be fixed to each other by stitches, adhesive or by any other fixing material. The seam 35 of the sleeve 30 is then permanently fixed to the front surface 28 of second arm 27, by adhesive, double sided tape or any other permanent bonding material. It is preferred that the seam 35 of the sleeve 30 be attached to the front surface 28 of second arm 27 in order to conceal the seam 35 and give the holder 10 a clean, finished external appearance.

The size of the holder 10 is small so that it does not occupy a lot of space and so that it can be placed in an easily accessible area. The preferred dimensions of the clip 20 are about 2 ½" long from the top of the U-shaped region 23 to the lowest end of second arm 27 of the clip 20 and about ½" to 1" wide. The sleeve 30 is about 2 3/16" long starting from the lowest end of second arm 27 and going up on the front surface 28 of the clip 20. The clip 20 is preferably formed of plastic by injection molding or other techniques well known in the art. The plastic may include resin, polycarbonate, polyvinyl chloride (PVC), or any other sturdy lightweight material. For example, the clip 20 can be formed of aluminum or other lightweight metals.

The sleeve 30 is a straight tube about 11/16" wide across the top end 32 and about 9/16" across at the bottom end 34. The difference in width between top end 32 and bottom end 34 is attributed to the elastic ring 31 added to the top end 32 of the sleeve 30. The diameter of the opening of the cavity O is about 9/16" at both the top end 32 and the bottom end 34. Note that all of the foregoing dimensions are representative dimensions only and are not intended to limit the scope of the holder 10.

The sleeve 30, of the holder 10, is designed to hold only one temple piece 52, 54 at a time. Ultimately, the holder 10 permits the user to hang a pair of glasses 50 from anything that can receive and retain the clip 20. In use, both temple pieces 52, 54 of the eyeglasses 50 are first folded into a closed position. Then the outermost temple piece 52 is inserted in the cavity O through the open top 32 of the sleeve 30. The temple piece 52 passes down through the open cavity O and exits out the cavity O through the open bottom 34. The temple piece 52 completely passes through and exits out the cavity O, being grasped around the length of the temple piece 52 by the sleeve 30.

Figure 5:
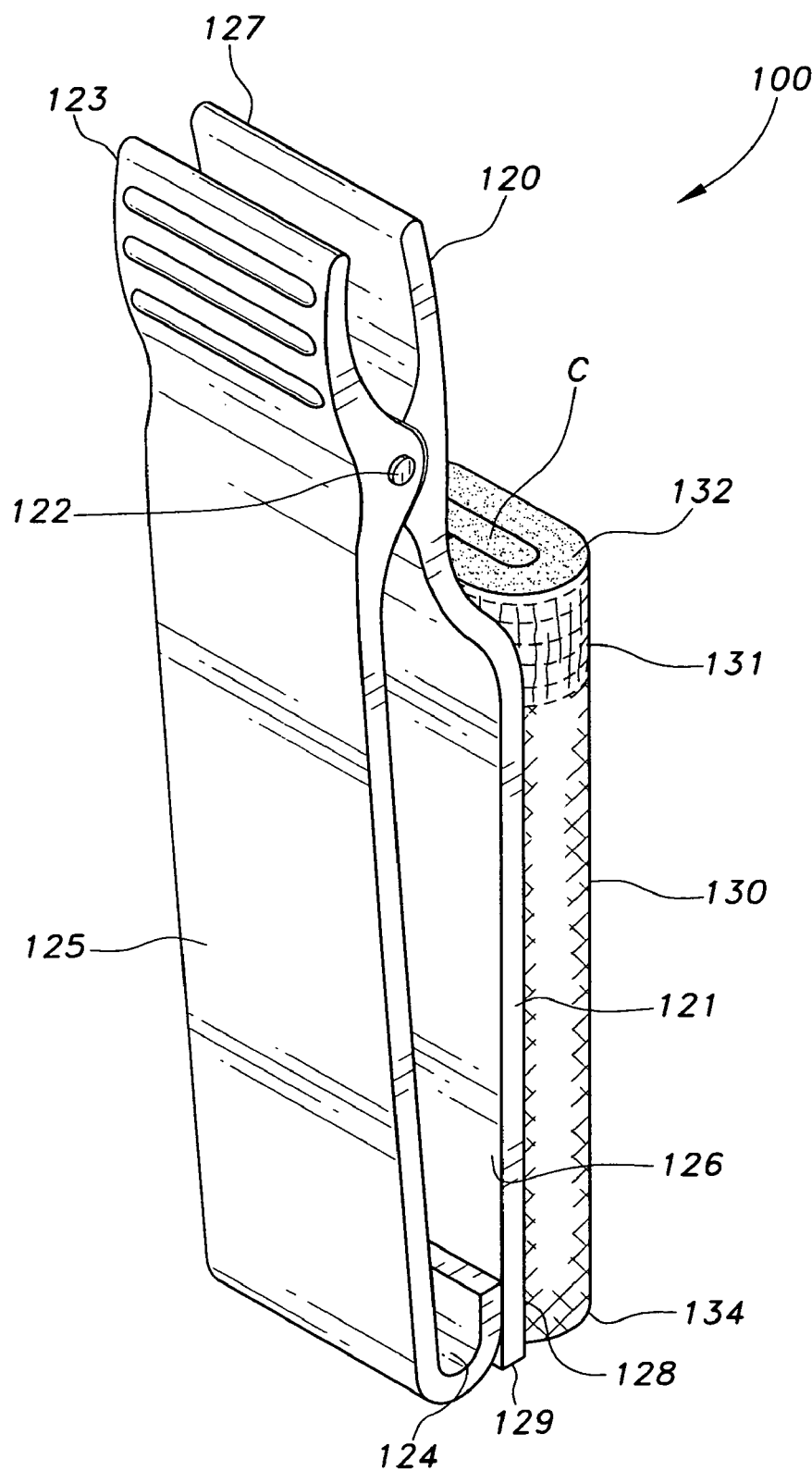
FIG. 5 is a perspective view of an alternate embodiment of a holder for eyeglasses according to the present invention.

FIG. 5 shows an alternative embodiment of holder 100. The holder 100 comprises a spring-loaded clip 120 and a sleeve 130. The clip 120 has a first arm 121 and a second arm 125 hinged together by a pin 122. The first arm 125 has a front surface 128, a rear surface 126 an upper end 127 and a lower end 129. The second arm 125 has an upper end 123 and a hooked lower end 124. The sleeve 130 is attached to the front surface 128. The sleeve 130 has a top end 132, a bottom end 134, a cavity C and stitches 131 disposed at the top end 132. Again, as with the preferred embodiment 10, the clip 120 is attached to the sleeve 120 parallel to the cavity C. In use, the spring-loaded clip 120 is opened by pressing together upper ends 123, 127 of first and second arms 121, 125, respectively.

It is to be understood that the present invention is not limited to the embodiments described above, but encompasses any and all embodiments within the scope of the following claims.

I claim:

1. A holder for eyeglasses, comprising:
    an elongated tubular sleeve defining an open top end, an open bottom end, and a cavity disposed between the open top and open bottom; and
    a clip having a second arm including a front surface and a rear surface, and having a first arm resiliently biased against the rear surface of the second arm, the sleeve being attached to the front surface of the second arm, whereby the holder is adapted for being secured to a support by the clip with a temple piece of the eyeglasses inserted through and gripped by the sleeve in order to hold the eyeglasses when not in use; and,
    an elastic band sewn around the open top end of the sleeve to tighten the hold of the sleeve around the temple piece of the eyeglasses.

2. The holder of claim 1, wherein the sleeve is made of elastic material.

3. The holder of claim 1, wherein the sleeve is made of neoprene.

4. The holder of claim 1, wherein the sleeve is made of spandex.

5. The holder of claim 1, wherein the sleeve is made of leather.

6. The holder of claim 1, wherein the clip is made of plastic.

7. The holder of claim 1, wherein the clip is made of lightweight material.

8. The holder of claim 1, wherein the clip is made of aluminum.

9. The holder of claim 1, wherein the clip is made of lightweight metal.

10. The holder of claim 1, wherein the rear surface of the first arm has ribs extending therefrom.

11. A holder for eyeglasses, comprising:
    an elongated tubular sleeve defining an open top end, an open bottom end, and a cavity disposed between the open top and open bottom; and
    a fastener, the sleeve being attached to the fastener, whereby the holder is adapted for being secured to a support by the fastener with a temple piece of the eyeglasses inserted through and gripped by the sleeve in order to hold the eyeglasses when not in use; and
    an elastic band sewn around the open top end of the sleeve to tighten the hold of the sleeve around the temple piece of the eyeglasses.

12. The holder of claim 11, wherein the fastener is a U-shaped clip having a first arm, a U-shaped region, and a second arm, the second arm having a front surface and a rear surface, the sleeve being attached to the front surface of the second arm.

13. The holder of claim 12, wherein the first arm is resiliently biased to the rear surface of said second arm.

14. The holder of claim 13, wherein the first arm has a lower end and a lip extending the lower end facing and closely abutting the rear surface of said second arm.

15. The holder of claim 11, wherein the fastener is a clip having a first arm including a front surface and a rear surface, and having a second arm resiliently biased against the rear surface of the first arm, the sleeve being attached to the front surface of the first arm.

16. The holder of claim 11, wherein the fastener is made of plastic.

17. The holder of claim 11, wherein the fastener is made of lightweight material.

18. The holder of claim 11, wherein the sleeve is made of elastic material.

* * * * *